US012570857B2

(12) United States Patent
Zhou

(10) Patent No.: US 12,570,857 B2
(45) Date of Patent: Mar. 10, 2026

(54) DISPLAY PANEL, MANUFACTURING METHOD THEREOF, AND DISPLAY DEVICE THEREOF

(71) Applicant: WUHAN CHINA STAR OPTOELECTRONICS SEMICONDUCTOR DISPLAY TECHNOLOGY CO., LTD., Hubei (CN)

(72) Inventor: Jing Zhou, Hubei (CN)

(73) Assignee: WUHAN CHINA STAR OPTOELECTRONICS SEMICONDUCTOR DISPLAY TECHNOLOGY CO., LTD., Wuhan (CN)

( * ) Notice: Subject to any disclaimer, the term of this patent is extended or adjusted under 35 U.S.C. 154(b) by 835 days.

(21) Appl. No.: 17/617,925

(22) PCT Filed: Dec. 8, 2021

(86) PCT No.: PCT/CN2021/136495
§ 371 (c)(1),
(2) Date: Dec. 9, 2021

(87) PCT Pub. No.: WO2023/097718
PCT Pub. Date: Jun. 8, 2023

(65) Prior Publication Data
US 2024/0010842 A1 Jan. 11, 2024

(30) Foreign Application Priority Data
Nov. 30, 2021 (CN) .......................... 202111450503.5

(51) Int. Cl.
*C09C 1/56* (2006.01)
*C09C 3/00* (2006.01)
(Continued)

(52) U.S. Cl.
CPC .............. *C09C 1/565* (2013.01); *C09C 3/006* (2013.01); *G02B 1/10* (2013.01); *G02B 5/003* (2013.01);
(Continued)

(58) Field of Classification Search
CPC ............ C01P 2004/62; C01P 2004/64; H10K 59/30; H10K 59/32; H10K 59/35;
(Continued)

(56) References Cited

U.S. PATENT DOCUMENTS

| | | | |
|---|---|---|---|
| 6,358,602 B1 * | 3/2002 | Horiuchi | C09D 11/00 |
| | | | 428/323 |
| 2020/0110337 A1 * | 4/2020 | Tanigaki | C08F 291/00 |
| 2020/0185642 A1 * | 6/2020 | Chen | H10K 59/871 |
| 2022/0271103 A1 * | 8/2022 | Hai | G06V 10/147 |

FOREIGN PATENT DOCUMENTS

| | | |
|---|---|---|
| CN | 103261336 A | 8/2013 |
| CN | 103443155 A | 12/2013 |

(Continued)

OTHER PUBLICATIONS

Matsuhira et al., Polymerizable composition, photosensitive composition for black matrixes, and photosensitive composition for black column spacers, 2018, machine translation of WO 2018235664 A1, pp. 1-25. (Year: 2018).*

(Continued)

*Primary Examiner* — Natalia A Gondarenko
(74) *Attorney, Agent, or Firm* — PV IP PC; Christopher S. Ruprecht; Wei Te Chung

(57) ABSTRACT

An embodiment of the present application discloses a display panel, a manufacturing method thereof, and a display device thereof. The display panel includes a light emission functional layer and a color filter layer, the color filter layer includes a light shielding units, a light shielding material in the light shielding units includes a light shielding compo- (Continued)

sition. The light shielding composition includes a plurality of carbon black particles and at least one function group located on surfaces of the carbon black particles. The function group is an acidic functional group or a free radical capture group, the acidic functional group is one of a carboxyl group, a hydroxy group, and a carbonyl group. The free radical capture group is a ketone group.

8 Claims, 5 Drawing Sheets

(51) Int. Cl.
  *G02B 1/10*    (2015.01)
  *G02B 5/00*    (2006.01)
  *G02B 27/02*   (2006.01)

(52) U.S. Cl.
  CPC ........ *G02B 27/024* (2013.01); *C01P 2004/62*
      (2013.01); *C09C 2220/106* (2013.01)

(58) Field of Classification Search
  CPC .............. H10K 59/351; H10K 59/352; H10K
     59/353; H10K 59/38; H10K 59/50; H10K
     59/805; H10K 59/8051; H10K 59/80515;
     H10K 59/8052; H10K 59/80521; H10K
     50/10; H10K 50/805; H10K 50/813;
     H10K 50/822; H10K 50/84; H10K
     50/8428; H10K 50/86; H10K 50/865;
     H10K 71/00; G02B 1/10; G02B 5/003;
     G02B 27/024; C09C 1/565; C09C 3/006;
     C09C 3/08; C09C 2220/106
  USPC ..................................................... 257/88, 72
  See application file for complete search history.

(56) References Cited

FOREIGN PATENT DOCUMENTS

| | | | | | |
|---|---|---|---|---|---|
| CN | 103923498 | A | | 7/2014 | |
| CN | 104145196 | A | | 11/2014 | |
| CN | 104254790 | A | | 12/2014 | |
| CN | 104710844 | A | | 6/2015 | |
| CN | 105518087 | A | | 4/2016 | |
| CN | 105556390 | A | | 5/2016 | |
| CN | 104245855 | B | * | 4/2017 | .............. C09C 1/48 |
| CN | 108027561 | A | | 5/2018 | |
| CN | 110024485 | A | | 7/2019 | |
| CN | 111095104 | A | | 5/2020 | |
| CN | 111190328 | A | | 5/2020 | |
| CN | 112159585 | A | | 1/2021 | |
| CN | 112861763 | A | | 5/2021 | |
| JP | H09265006 | A | | 10/1997 | |
| JP | 109328618 | A | | 12/1997 | |
| JP | 2005166645 | A | | 6/2005 | |
| WO | WO-2017038333 | A1 | * | 3/2017 | .............. B82Y 5/00 |
| WO | WO-2018235664 | A1 | * | 12/2018 | .............. C08F 2/50 |

OTHER PUBLICATIONS

Ito et al., Resin Composition, 2017, machine translation of WO 2017038333 A1, pp. 1-19. (Year: 2017).*
Idogawa, Carbon black for black matrix and its manufacturing method, 2017, machine translation of CN 104245855 B, pp. 1-8. (Year: 2017).*
International Search Report in International application No. PCT/CN2021/136495, mailed on Jul. 27, 2022.
Written Opinion of the International Search Authority in International application No. PCT/CN2021/136495, mailed on Jul. 27, 2022.
Chinese Office Action issued in corresponding Chinese Patent Application No. 202111450503.5 dated Nov. 22, 2022, pp. 1-8.

* cited by examiner

100

10

| |
|---|
| providing a plurality of carbon black particles — S100 |
| mixing the carbon black particles and oxidizing solution, forming at least one function group to form a light shielding composition — S200 |
| forming a plurality of light shielding units comprising the light shielding composition and colored color resists each adjacent two of the light shielding units — S300 |

DISPLAY PANEL, MANUFACTURING METHOD THEREOF, AND DISPLAY DEVICE THEREOF

FIELD OF INVENTION

The present application relates to a field of displays, especially to a display panel, a manufacturing method thereof, and a display device thereof.

BACKGROUND OF INVENTION

In recent years, color filters have been used to replace POL-less technologies of polarizers (POLs). Such technology not only effectively thin a thickness of a functional layer, but also improve a light exiting rate. However, compared to the polarizer, requirements for materials and processes of a photoresist of the color filter are higher, need all time temperature control to prevent a high temperature. Therefore, during manufacturing processes of light shielding compositions of the color filter, abnormal aggregation of the light shielding material easily occurs, and light shielding black points are formed in a region without disposing the light shielding material to affect display and light effecting performance.

Therefore, a display panel, a manufacturing method thereof, and a display device thereof are required urgently for solving the above technical issue.

SUMMARY OF INVENTION

Technical Issue

The present application provides a display panel, a manufacturing method thereof, and a display device thereof that can ease a technical issue that the conventional light shielding material easily has abnormal aggregation and light shielding black points are easily formed in a region without disposing a light shielding material.

Technical Solution

To solve the above issue, the present application provides a technical solutions as follows:

An embodiment of the present application provides a display panel, comprising:

a light emission functional layer comprising a plurality of light emitting units; and a color filter layer located on the light emission functional layer, wherein the color filter layer comprises colored color resists corresponding to the light emitting units and light shielding units each located between adjacent two of the colored color resists, the light shielding units comprise a light shielding material, the light shielding material comprise a light shielding composition, the light shielding composition comprises a plurality of carbon black particles and at least one function group located on surfaces of the carbon black particles, and the function group is an acidic functional group or a free radical capture group;

wherein the acidic functional group is one of a carboxyl group, a hydroxy group, and a carbonyl group, the free radical capture group.

Preferably, any one of the function group is connected to one of biphenyl rings of the surfaces of the carbon black particles.

Preferably, a benzene ring of the biphenyl rings is at most connected to one of the function group.

Preferably, the function group is located near an edge end of the biphenyl ring.

Preferably, at least three carbon atoms are connected between adjacent two of the function group.

Preferably, the light shielding material further comprises a carrier composition, a functional solvent, and a stabilizer; wherein a mass percentage of the light shielding composition in the light shielding material is 1% to 10%, a mass percentage of the carrier composition in the light shielding material is 5% to 15%, a mass percentage of the functional solvent in the light shielding material is 70% to 90%, and a mass percentage of the stabilizer in the light shielding material is 1% to 5%.

Preferably, a particle diameter of the carbon black particles is from 100 nm to 150 nm.

The embodiment of the present application also provides a display panel manufacturing method, comprising:

providing a plurality of carbon black particles;

mixing the carbon black particles with an oxidizing solution, forming at least one function group on surfaces of the carbon black particles to form a light shielding composition; and forming a plurality of light shielding units including the light shielding composition on the light emission functional layer and forming colored color resists each located between adjacent two of the light shielding units on the light emission functional layer;

wherein the oxidizing solution is one or a mixture of more than one of nitric acid, hydrogen peroxide solution, saturated ammonium persulfate solution, perchloric acid, hypochlorous acid, isocyanate solution, and potassium permanganate solution.

Preferably, the step of mixing the carbon black particles with an oxidizing solution to form at least one function group on surfaces of the carbon black particles, comprises: mixing the carbon black particles with an oxidizing solution and forming a first mixture; and performing an ultrasonic process and a stirring process to the first mixture to form at least one function group on surfaces of the carbon black particles.

Preferably, the step of mixing the carbon black particles with an oxidizing solution, forming at least one function group on surfaces of the carbon black particles to form a light shielding composition comprises: mixing the carbon black particles with an oxidizing solution and forming a first mixture; performing an ultrasonic process and a stirring process to the first mixture to form at least one function group on surfaces of the carbon black particles; vacuum-drying the first mixture; and mixing the carbon black particles with a carrier composition, a functional solvent, and a stabilizer to form a light shielding material.

Preferably, the step of forming a plurality of light shielding units including the light shielding composition on the light emission functional layer and forming colored color resists each located between adjacent two of the light shielding units on the light emission functional layer, comprises: utilizing the light shielding material comprising the light shielding composition, the carrier composition, the functional solvent, and the stabilizer to form a plurality of light shielding units on the light emission functional layer; and forming colored color resists each between adjacent two of the light shielding units.

Preferably, a mass percentage of the light shielding composition in the light shielding material is 1% to 10%, a mass percentage of the carrier composition in the light shielding material is 5% to 15%, a mass percentage of the functional solvent in the light shielding material is 70% to 90%, and a mass percentage of the stabilizer in the light shielding material is 1% to 5%.

Preferably, the step of providing a plurality of carbon black particles: cleaning the carbon black particles sequentially by deionized water, acetone, alcohol, and distilled water to obtain a first suspension; cleaning the first suspension by ultrasonic wave; and filtering and drying the first suspension.

The embodiment of the present application also provides a display device, comprising a display panel and a device main body, wherein the display panel combines the device main body as a whole, and the display panel comprises:

a light emission functional layer comprising a plurality of light emitting units; and a color filter layer located on the light emission functional layer, wherein the color filter layer comprises colored color resists corresponding to the light emitting units and light shielding units each located between adjacent two of the colored color resists, the light shielding units comprise a light shielding material, the light shielding material comprise a light shielding composition, the light shielding composition comprises a plurality of carbon black particles and at least one function group located on surfaces of the carbon black particles, and the function group is an acidic functional group or a free radical capture group;

wherein the acidic functional group is one of a carboxyl group, a hydroxy group, and a carbonyl group, the free radical capture group.

Preferably, any one of the function group is connected to one of biphenyl rings of the surfaces of the carbon black particles.

Preferably, a benzene ring of the biphenyl rings is at most connected to one of the function group.

Preferably, the function group is located near an edge end of the biphenyl ring.

Preferably, at least three carbon atoms are connected between adjacent two of the function group.

Preferably, the light shielding material further comprises a carrier composition, a functional solvent, and a stabilizer; wherein a mass percentage of the light shielding composition in the light shielding material is 1% to 10%, a mass percentage of the carrier composition in the light shielding material is 5% to 15%, a mass percentage of the functional solvent in the light shielding material is 70% to 90%, and a mass percentage of the stabilizer in the light shielding material is 1% to 5%.

Preferably, a particle diameter of the carbon black particles is from 100 nm to 150 nm.

Advantages

The present application modifies oxygen-containing group on the surfaces of the carbon black particles, generates acidic functional groups and free radical capture groups on the surfaces such that activity and polarity of the surfaces of the carbon black particles increase, an agglomeration trend of the carbon black particles decreases to improve dispersion of the carbon black particles, increase dissolving reaction of the developer to black points of the agglomerated carbon black particles, and avoid generation of the black points, which enhances display and light emitting performance of the display panel.

DETAILED DESCRIPTION OF PREFERRED EMBODIMENTS

Figure 1:
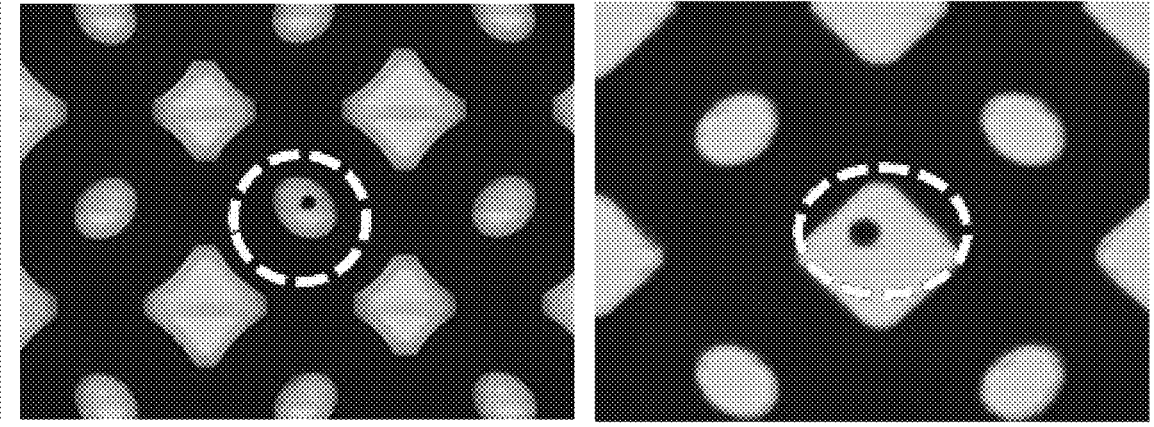
FIG. 1 is an enlarged view of a conventional region without disposing a light shielding material to form light shielding black points.

The present application provides a display panel, a manufacturing method thereof, and a display device thereof. To make the objective, the technical solution, and the effect of the present application clearer and more explicit, the present application will be further described in detail below with reference to the accompanying drawings. It should be understood that the specific embodiments described here are only used to explain the present application instead of being used to limit the present application.

The embodiment of the present application provides a display panel, a manufacturing method thereof, and a display device thereof, which will be described in detail respectively as follows. It should be explained that a description order of the following embodiments has no limit to the preferred sequence of the embodiments.

With reference to FIGS. 1 to 6, the embodiment of the present application provides a display panel 100 comprising:

a light emission functional layer 200 comprising a plurality of light emitting units 210; and a color filter layer 300 located on the light emission functional layer 200, wherein the color filter layer 300 comprises colored color resists 310 corresponding to the light emitting units 210 and light shielding units 320 each located between adjacent two of the colored color resists 310, the light shielding units 320 comprises a light shielding material, the light shielding material comprises a light shielding composition 10, the light shielding composition 10 comprises a plurality of carbon black particles 20, and at least one function group 30 located on surfaces of the carbon black particles 20, and the function group 30 is an acidic functional group 31 or a free radical capture group 32;

wherein the acidic functional group 31 is one of a carboxyl group, a hydroxy group, and a carbonyl group, and the free radical capture group 32 is a ketone group.

The present application modifies oxygen-containing group on the surfaces of the carbon black particles, generates acidic functional groups and free radical capture groups on the surfaces such that activity and polarity of the surfaces of the carbon black particles increase, an agglomeration trend of the carbon black particles decreases to improve dispersion of the carbon black particles, increase dissolving reaction of the developer to black points of the agglomerated carbon black particles, and avoid generation of the black points, which enhances display and light emitting performance of the display panel.

A technical solution of the present application is described in detail with specific embodiments.

Figure 5:
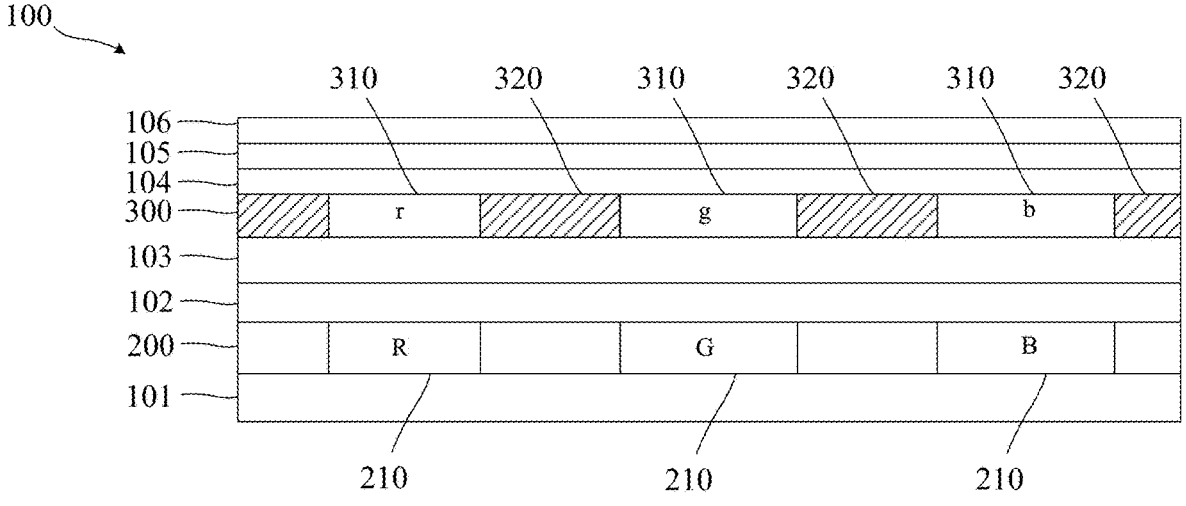
FIG. 5 is a schematic structural view of a display panel provided by the embodiment of the present application.

In the present embodiment, with reference to FIG. 5, the display panel 100 comprises a light emission functional layer 200 and a color filter layer 300 located on the light emission functional layer 200. The color filter layer 300 comprises colored color resists 310 corresponding to the light emitting units 210 and light shielding units 320 each located between adjacent two of the colored color resists 310.

In some embodiments, with reference to FIG. 5, the colored color resists 310 is any one of a red color resist r, a green color resist g, and a blue color resist b.

In some embodiments, with reference to FIG. 5, the light emission functional layer 200 comprises a plurality of light emitting units 210, the light emitting units 210 is one of the red unit R, the green unit G, and the blue unit B. A color of the colored color resists 310 corresponds to a color of the light emitting units 210.

In some embodiments, the light shielding units 320 comprise a light shielding material, the light shielding material comprises a light shielding composition 10, the light shielding composition 10 comprises a plurality of carbon black particles 20, and at least one function group 30 located on surfaces of the carbon black particles 20. The function group 30 is an acidic functional group 31 or a free radical capture group 32. The acidic functional group 31 is one of a carboxyl group, a hydroxy group, and a carbonyl group, and the free radical capture group 32 is ketone group.

Figure 2:
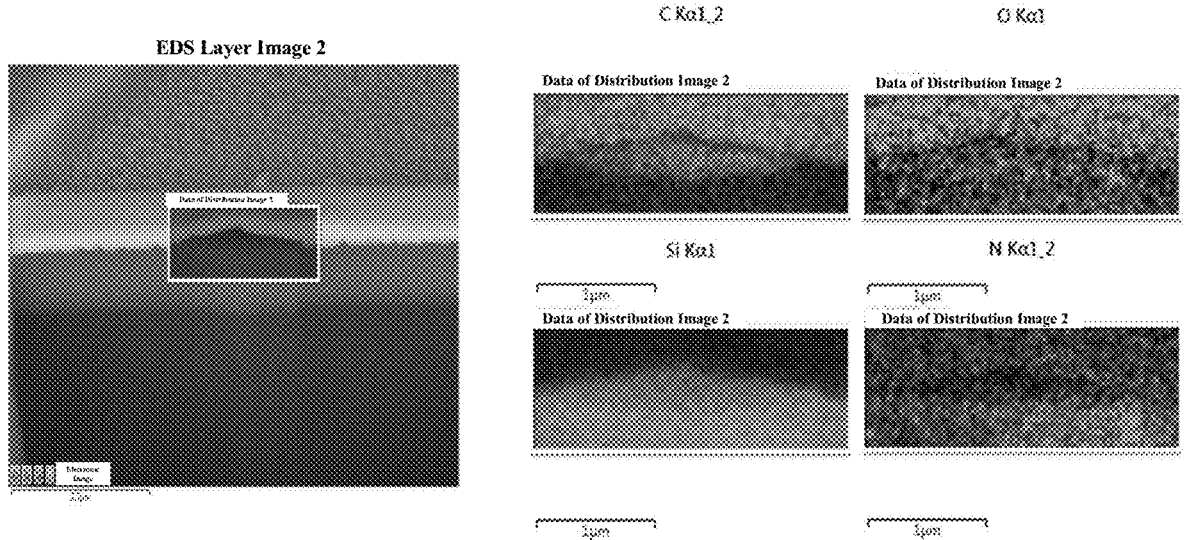
FIGS. 2 and 3 are views of a result of energy spectrum scanning to the light shielding black points.
Figure 3:
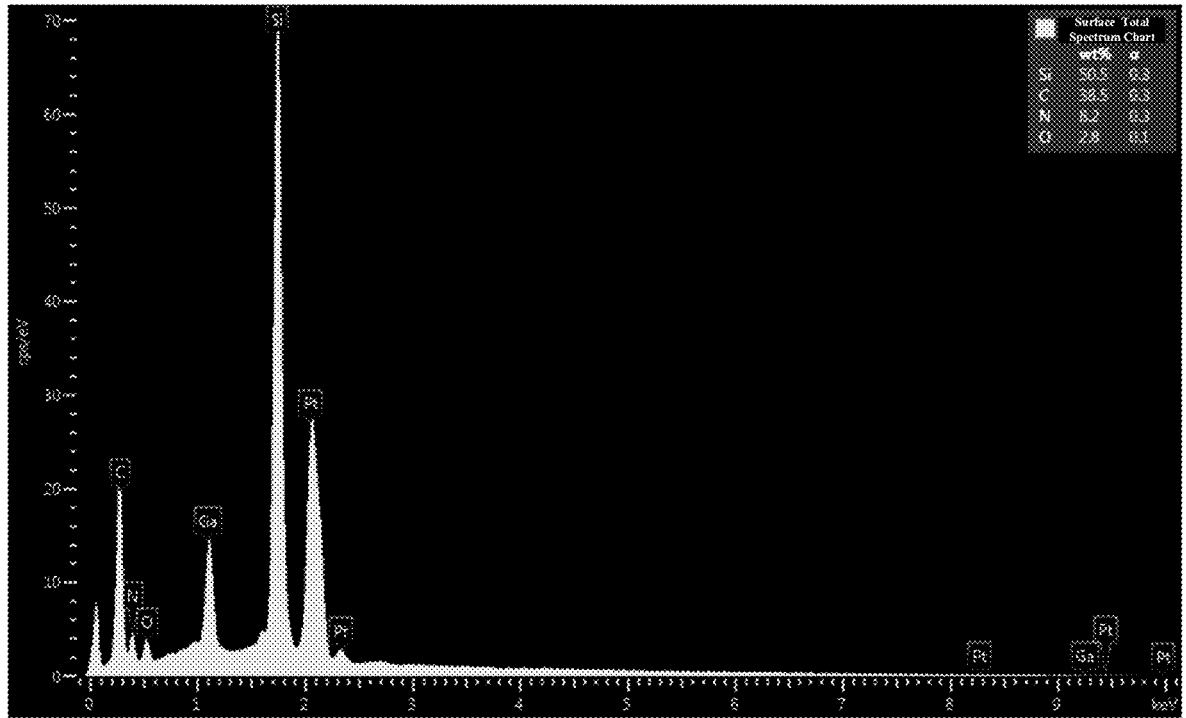

In the color filter layer, with reference to FIGS. 1 to 3, a light shielding material (BM) manufacturing is included, during the BM processes, especially a temperature control process, a BM hole is detected to easily have small black points. With reference to FIG. 1, an area of small black points is under 10 μm², a FIB cross section cutting test is performed to a region of small black points. With reference to FIGS. 2 and 3, in the region of small black points, a content of Si: 50.5%; a content of C: 38.5%; a content of N: 8.2%; a content of O: 2.8%. Except for Si and N elements (The base of the process is SiNx) that can be scanned out by energy spectrum, a main composition content of black points is C, which can indicate that the small black points is mainly an agglomeration product of C.

Figure 4:
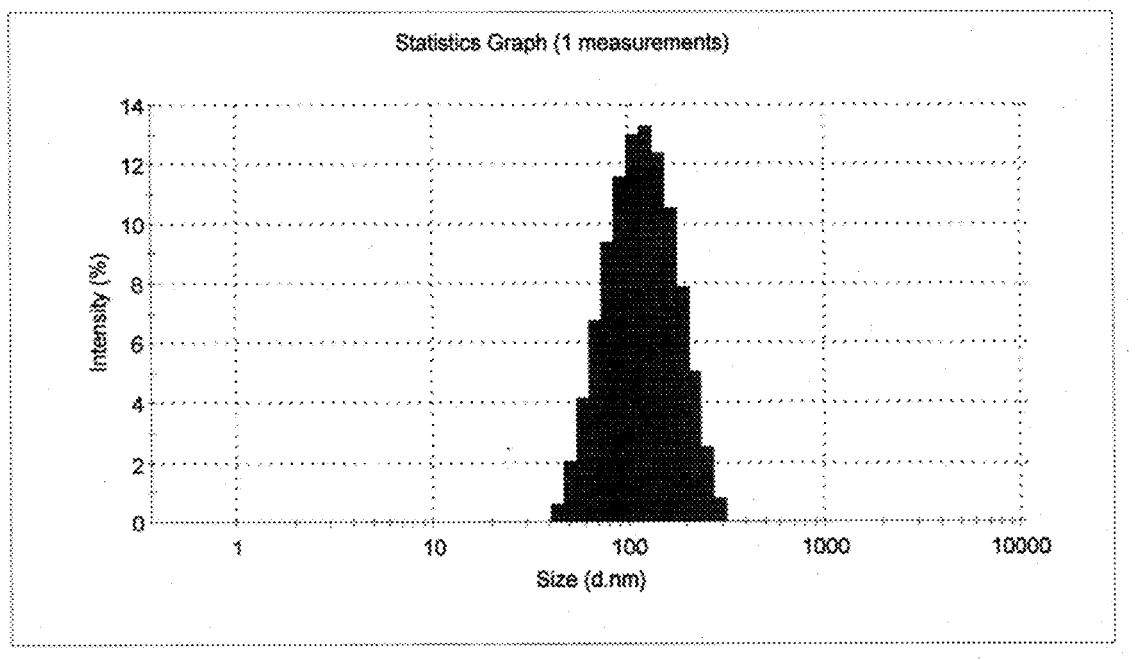
FIG. 4 is a view of particle diameter distribution of carbon black in a liquid adhesive BM.

With reference to FIG. 4, the carbon black in the material is analyzed, sizes, for distributions of particles of the carbon black in the liquid adhesive BM, particle diameters of the carbon black are all within from 106 nm to 142 nm, which coincides with particle diameters of raw materials of the carbon black particles and indicates no obvious agglomeration condition. Therefore, it is determined that the carbon black is distributed normally under a liquid state of the material, generation of small black points occurs due to that during the process the light shielding composition combining the BM material is the carbon black, which indicates that the issue of small black points occurring on the material is mainly due to agglomeration of the carbon black composition.

Increasing the acidic functional group 31 improves a dissolving ability of the developer to the carbon black. Furthermore, the functional group of the surface for capturing free radicals increases, an ability of the group of such structure is the same as a structural effect of polymerization inhibitor, can enhance stability of the material, increase a surface activity and a surface polarity of the carbon black, lower an agglomeration trend of the carbon black, suppress agglomeration of the carbon black particles 20, which improves dispersion of the carbon black particles 20, prevents generation of black points, and enhances display and light emitting performance of the display panel 100.

In some embodiments, a surface of the carbon black particle 20 comprises biphenyl rings, and any one of the function group 30 is connected to one of the biphenyl rings of the surfaces of the carbon black particles 20.

The biphenyl ring is easy for modification and replacement of groups, can control a modification ratio of the function group 30, adjust an agglomeration degree of the carbon black particles 20 to improve dispersion of the carbon black particles 20, prevent generation of black points, and enhance display and light emitting performance of the display panel 100.

Figure 6:
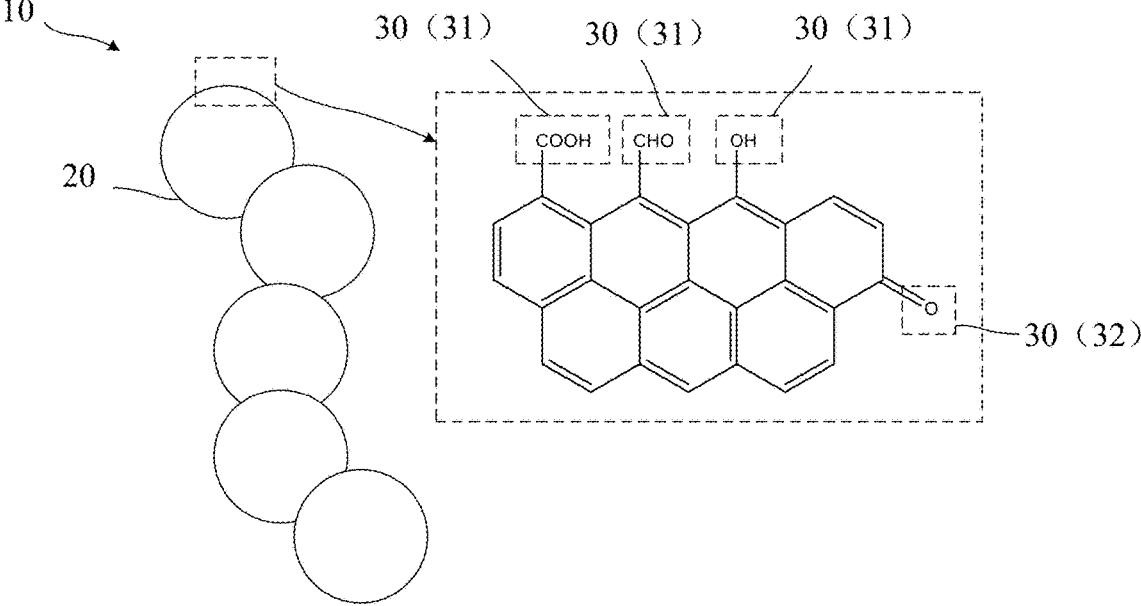
FIG. 6 is a schematic structural view of a light shielding composition in the display panel provided by the embodiment of the present application.

In some embodiments, with reference to FIG. 6, a benzene ring of the biphenyl rings is at most connected to one of the function group 30. A benzene ring of the biphenyl rings is at most connected to one function group 30, which can guarantee the function group 30 can be dispersed relatively to evenly improve dispersion of the carbon black particles 20. At the same time, modifying one function group 30 on a benzene ring of the biphenyl rings can also prevent the multiple function groups 30 from influencing one another on a benzene ring of the biphenyl rings such that adding and modifying processes are easier and other reaction products are prevented.

In some embodiments, the light shielding composition 10 comprises a plurality of functional composition groups, in one of the functional composition groups, adjacent two of the function group 30 are located on adjacent two of the benzene ring respectively, and adjacent two of the functional composition groups are spaced.

In one of the functional composition groups, the benzene rings corresponding to the function group 30 are disposed continuously to space adjacent two of the functional composition groups such that modification can be performed in different regions of the carbon black particles 20.

In some embodiments, the functional composition groups are distributed evenly. Evenly distributing the spaced functional composition groups enhances uniformity of performance of the carbon black particles 20, improves dispersion of the carbon black particles 20, prevents generation of black points, and improves display and light emitting performance of the display panel 100.

In some embodiments, the function group 30 is located near an edge end of the biphenyl ring.

Modification of modifying the function group 30 on a side of an edge end of the biphenyl rings makes the end portion easily modified with the function group 30, easier improves dispersion of the carbon black particles 20, prevents generation of black points, and enhances display and light emitting performance of the display panel 100.

In some embodiments, at least three carbon atoms are connected between adjacent two of the function group 30.

Adjacent two of the functional group can be disposed on adjacent two of the benzene rings. Even the two function groups 30 are connected to the same benzene ring, at least three carbon atoms are intervened therebetween, which is interval disposing, can guarantee relative dispersion of the function groups 30 to evenly improve dispersion of the carbon black particles 20. At the same time, modifying the function group 30 on a benzene ring of the biphenyl rings can also prevent a plurality of the function group 30 from influencing one another on a benzene ring of the biphenyl rings such that adding and modifying processes are easier and other reaction products are prevented.

In some embodiments, the light shielding material further comprises a carrier composition, a functional solvent, and a stabilizer; wherein a mass percentage of the light shielding composition 10 in the light shielding material is from 1% to 10%, a mass percentage of the carrier composition in the light shielding material is 5% to 15%, a mass percentage of the functional solvent in the light shielding material is 70% to 90%, and a mass percentage of the stabilizer in the light shielding material is 1% to 5%.

In some embodiments, the carrier composition is acrylic series, can be acrylic, is a main composition of the light shielding material, and perform a function of carrying other composition.

In some embodiments, the functional solvent comprises a photoresist solvent and a general solvent. A mass percentage of the photoresist solvent in the light shielding material is from 40% to 50%. A mass percentage of the general solvent in the light shielding material is from 30% to 40%.

In some embodiments, the photoresist solvent is propylene glycol monomethyl ether acetate (PGMEA), has a molecular formula of $C_6H_{12}O_3$, is colorless and moisture absorption liquid, has a special small, is a non-polluting solvent including multiple functional groups, and is for photoresist solvent.

In some embodiments, the general solvent is cyclohexanone.

In some embodiments, the stabilizer is dimethyl succinate.

In some embodiments, an optical density (OD) of the light shielding material is greater than 2 μm, a refractive index of the light shielding material is from 1.2 to 1.8 to match a refractive index of the transparent photoresist layer 104 in display panel 100. The refractive index of the transparent photoresist layer 104 in the display panel 100 is about 1.4. It prevents a difference between the refractive indexes of the two materials from being too large, which prevents increase of reflection rate to affect a display effect.

In some embodiments, a particle diameter of the carbon black particles 20 is from 100 nm to 150 nm. Controlling the carbon black particles 20 in the range, on the one hand improves uniformity to improve the light shielding performance, on the other hand easier focuses on collective modification by selecting the carbon black particles 20 with a greater particle diameter. The great particle itself easier improves dispersion of the carbon black particles 20 and reduces agglomeration of carbon black, which prevents generation of black points and enhances display and light emitting performance of the display panel 100.

In some embodiments, the display panel 100 further comprises an array substrate 101 located on a side of the light emission functional layer 200 away from the color filter layer 300.

In some embodiments, the array substrate 101 comprises an underlay, an active layer located on the underlay, a gate electrode insulation layer located on the active layer, a gate electrode layer located on the gate electrode insulation layer, an interlayer insulation layer located on the gate electrode layer, and a source and drain electrode layer located on the gate electrode insulation layer.

In some embodiments, the light emission functional layer 200 comprises an interlayer insulation layer located on the array substrate 101, an anode layer located on the interlayer insulation layer, a light emitting material layer located on the anode layer, a cathode layer located on the light emitting material layer. the anode layer is electrically connected to the source and drain electrode layer through a via hole.

In some embodiments, with reference to FIG. 5, the display panel 100 further comprises an encapsulation layer 102 located between the light emission functional layer 200 and the color filter layer 300 and a touch layer 103 located on the encapsulation layer 102. The touch layer 103 is located between the color filter layer 300 and the encapsulation layer 102.

In some embodiments, with reference to FIG. 5, the display panel 100 further comprises a transparent photoresist layer 104 located on the color filter layer 300, an adhesive bonding layer 105 located on the transparent photoresist layer 104, and cover plate 106 located on the adhesive bonding layer 105.

In some embodiments, an optical density (OD) of the light shielding material is greater than 2 μm, a refractive index of the light shielding material is from 1.2 to 1.8 to match a refractive index of the transparent photoresist layer 104 in display panel 100. The refractive index of the transparent photoresist layer 104 in the display panel 100 is about 1.4. It prevents a difference between the refractive indexes of the two materials from being too large, which prevents increase of reflection rate to affect a display effect.

In some embodiments, the colored color resists 310 and the transparent photoresist layer 104 are low temperature photoresist materials, and a process temperature thereof is not greater than 90° C.

In some embodiments, the transparent photoresist layer 104 serves as a planarization layer, and a thickness of the transparent photoresist layer 104 is from 380 nm to 780 nm, and a transmittance of the transparent photoresist layer 104 is >90%.

The present application modifies oxygen-containing group on the surfaces of the carbon black particles, generates acidic functional groups and free radical capture groups on the surfaces such that activity and polarity of the surfaces of the carbon black particles increase, an agglomeration trend of the carbon black particles decreases to improve dispersion of the carbon black particles, increase dissolving reaction of the developer to black points of the agglomerated carbon black particles, and avoid generation of the black points, which enhances display and light emitting performance of the display panel.

Figure 7:
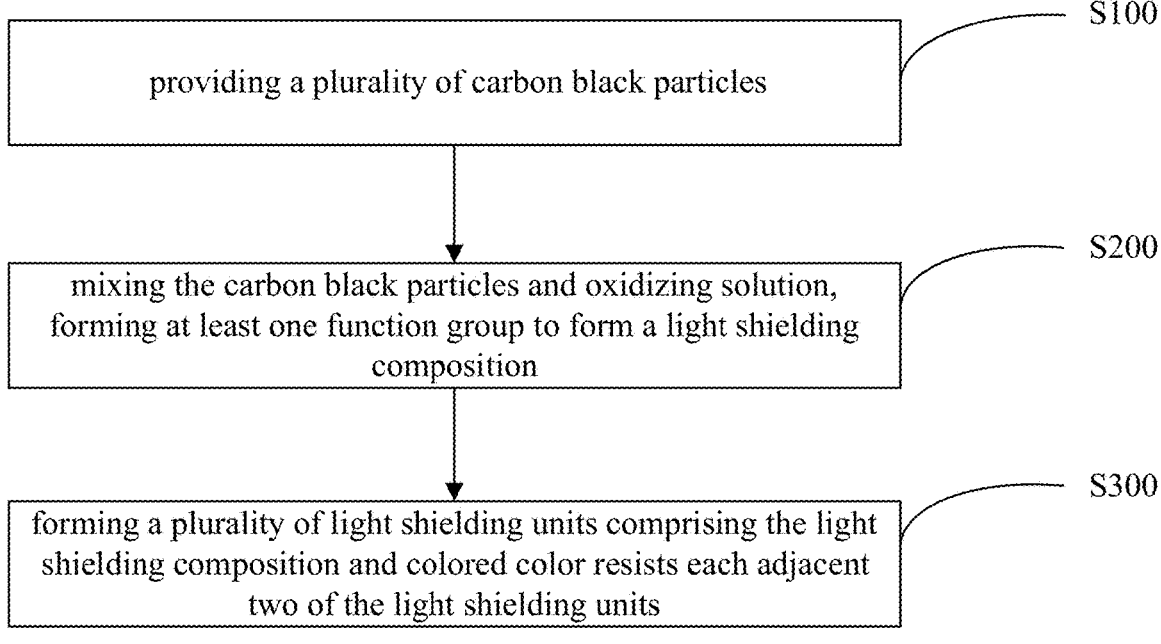
FIG. 7 is a step flowchart of a display panel manufacturing method provided by the embodiment of the present application.

With reference to FIG. 7, the embodiment of the present application also provides a display panel manufacturing method, comprising:

a step S100 providing a plurality of carbon black particles 20;

a step S200 mixing the carbon black particles 20 and oxidizing solution, forming at least one function group 30 to form a light shielding composition 10 on surfaces of the carbon black particles 20; and a step S300 forming a plurality of light shielding units 320 comprising the light shielding composition 10 and colored color resists 310 each adjacent two of the light shielding units 320 on light emission functional layer 200.

wherein the oxidizing solution is one or a mixture of more than one of nitric acid, hydrogen peroxide solution, saturated ammonium persulfate solution, perchloric acid, hypochlorous acid, isocyanate solution, and potassium permanganate solution.

The present application modifies oxygen-containing group on the surfaces of the carbon black particles, generates acidic functional groups and free radical capture groups on the surfaces such that activity and polarity of the surfaces of the carbon black particles increase, an agglomeration trend of the carbon black particles decreases to improve dispersion of the carbon black particles, increase dissolving reaction of the developer to black points of the agglomerated carbon black particles, and avoid generation of the black points, which enhances display and light emitting performance of the display panel.

A technical solution of the present application is described with specific embodiments.

In the present embodiment, the display panel manufacturing method comprises steps as follows:

A step S100 comprises providing a plurality of carbon black particles 20.

In some embodiments, the step S100 comprises:

A step S110, cleaning carbon black particles 20 sequentially by deionized water, acetone, alcohol, and distilled water to obtain a first suspension.

In some embodiments, a cleaning time of each cleaning type in the step S110 is from 15 min to 30 min.

A step S120 comprises cleaning the first suspension by ultrasonic wave.

A step S130 comprises filtering and drying the first suspension.

In some embodiments, the carbon black particles 20 after processed by the steps S110, S120, S130 can improve dispersion of the carbon black particles 20 themselves. The cleaning of the step S110 can remove additional impurities and improve dispersion of the carbon black particles 20. The ultrasonic wave cleaning and ultrasonic wave vibration of the step S120 can further improve dispersion of the carbon black particles 20.

In some embodiments, the step S130 performs filtering by a filter of filtering diameter of 0.3 μm.

In some embodiments, a particle diameter of the carbon black particles 20 is from 100 nm to 150 nm. Controlling the carbon black particles 20 in the range, on the one hand improves uniformity to improve the light shielding performance, on the other hand easier focuses on collective modification by selecting the carbon black particles 20 with a greater particle diameter. The great particle itself easier improves dispersion of the carbon black particles 20 and reduces agglomeration of carbon black, which prevents generation of black points and enhances display and light emitting performance of the display panel 100.

A step S200 comprises mixing the carbon black particles 20 with an oxidizing solution, and forming at least one function group 30 on surfaces of the carbon black particles 20 to form a light shielding composition.

In some embodiments, the oxidizing solution is one or a mixture of more than one of nitric acid, hydrogen peroxide solution, saturated ammonium persulfate solution, perchloric acid, hypochlorous acid, isocyanate solution, and potassium permanganate solution. The oxidizing solution with a strong oxidizing characteristic can modify the acidic functional group 31 or the free radical capture group 32 on the surfaces of the carbon black particles 20.

In some embodiments, the step S200 comprises steps as follows:

A step S210 comprises mixing the carbon black particles 20 with an oxidizing solution to form a first mixture.

A step S220 comprises performing an ultrasonic process and a stirring process to the first mixture to form at least one function group 30 on surfaces of the carbon black particles 20.

In some embodiments, a time of the ultrasonic process in the step S220 is 3 hours or more such that the first mixture can react sufficiently to make the carbon black particles 20 to be dispersed sufficiently.

In some embodiments, a time of the stirring process in the step S220 is 20 hours or more such that the first mixture can react sufficiently to make the carbon black particles 20 to be dispersed sufficiently.

A step S230 comprises vacuum-drying the first mixture.

In some embodiments, a temperature of the step S230 is from 80° C. to 120° C.

In some embodiments, a surface of the carbon black particle 20 comprises biphenyl rings, and any one of the function group 30 is connected to one of the biphenyl rings of the surfaces of the carbon black particles 20.

The biphenyl ring is easy for modification and replacement of groups, can control a modification ratio of the function group 30, adjust an agglomeration degree of the carbon black particles 20 to improve dispersion of the carbon black particles 20, prevent generation of black points, and enhance display and light emitting performance of the display panel 100.

In some embodiments, with reference to FIG. 6, a benzene ring of the biphenyl rings is at most connected to one of the function group 30. A benzene ring of the biphenyl rings is at most connected to one function group 30, which can guarantee the function group 30 can be dispersed relatively to evenly improve dispersion of the carbon black particles 20. At the same time, modifying one function group 30 on a benzene ring of the biphenyl rings can also prevent the multiple function groups 30 from influencing one another on a benzene ring of the biphenyl rings such that adding and modifying processes are easier and other reaction products are prevented.

In some embodiments, the light shielding composition 10 comprises a plurality of functional composition groups, in one of the functional composition groups, adjacent two of the function group 30 are located on adjacent two of the benzene ring respectively, and adjacent two of the functional composition groups are spaced.

In some embodiments, the functional composition groups are distributed evenly. Evenly distributing the spaced functional composition groups enhances uniformity of performance of the carbon black particles 20, improves dispersion of the carbon black particles 20, prevents generation of black points, and improves display and light emitting performance of the display panel 100.

In some embodiments, the function group 30 is located near an edge end of the biphenyl ring.

In some embodiments, at least three carbon atoms are connected between adjacent two of the function group 30.

In some embodiments, the step S200 further comprises:

a step S240, mixing the carbon black particles 20 with a carrier composition, a functional solvent, and a stabilizer to form a light shielding material.

In some embodiments, the light shielding material further comprises a carrier composition, a functional solvent, and a stabilizer. A mass percentage of the light shielding composition 10 in the light shielding material is 1% to 10%, a mass percentage of the carrier composition in the light shielding material is 5% to 15%, a mass percentage of the functional solvent in the light shielding material is 70% to 90%, and a mass percentage of the stabilizer in the light shielding material is 1% to 5%.

In some embodiments, the carrier composition is acrylic series, can be acrylic, is a main composition of the light shielding material, and perform a function of carrying other composition.

In some embodiments, the functional solvent comprises a photoresist solvent and a general solvent, a mass percentage of the photoresist solvent in the light shielding material is from 40% to 50%, and a mass percentage of the general solvent in the light shielding material is from 30% to 40%.

In some embodiments, the photoresist solvent is propylene glycol monomethyl ether acetate (PGMEA), has a molecular formula of $C_6H_{12}O_3$, is colorless and moisture absorption liquid, has a special small, is a non-polluting solvent including multiple functional groups, and is for photoresist solvent.

In some embodiments, the general solvent is cyclohexanone.

In some embodiments, the stabilizer is dimethyl succinate.

The step S300 comprises forming a plurality of light shielding units 320 comprising the light shielding composition 10 and colored color resists 310 each located between adjacent two of the light shielding units 320 on the light emission functional layer 200.

In some embodiments, the step S300 comprises steps as follows:

A step S310 comprises utilizing the light shielding material comprising the light shielding composition 10, the carrier composition, the functional solvent, and the stabilizer to form a plurality of light shielding units 320 on the light emission functional layer 200.

A step S320 comprises forming colored color resists 310 each located between adjacent two of the light shielding units 320.

In some embodiments, with reference to FIG. 5, the light emission functional layer 200 comprises a plurality of light emitting units 210. The light emitting units 210 is one of red unit R, green unit G, and blue unit B. A color of the colored color resists 310 corresponds to a color of the light emitting units 210.

The present application modifies oxygen-containing group on the surfaces of the carbon black particles, generates acidic functional groups and free radical capture groups on the surfaces such that activity and polarity of the surfaces of the carbon black particles increase, an agglomeration trend of the carbon black particles decreases to improve dispersion of the carbon black particles, increase dissolving reaction of the developer to black points of the agglomerated carbon black particles, and avoid generation of the black points, which enhances display and light emitting performance of the display panel.

Figure 8:
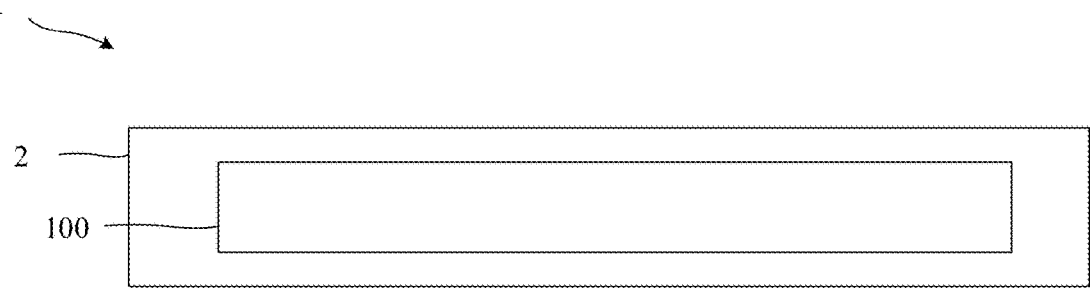
FIG. 8 is a schematic structural view of a display device provided by the embodiment of the present application.

With reference to FIG. 8, the embodiment of the present application also provides a display device 1, comprising any one of the display panels 100 as described above and a device main body 2. The device main body 2 combines the display panel 100 as a whole.

Specific structures of the display panel 100 refer to one of the embodiments of the display panel 100 and attached drawings, and is not described repeatedly herein.

In the present embodiment, the device main body 2 can comprise a middle frame, frame sealant, etc. The display device 1 can be a mobile terminal such as cell phone or tablet, which is not limited herein.

The present application modifies oxygen-containing group on the surfaces of the carbon black particles, generates acidic functional groups and free radical capture groups on the surfaces such that activity and polarity of the surfaces of the carbon black particles increase, an agglomeration trend of the carbon black particles decreases to improve dispersion of the carbon black particles, increase dissolving reaction of the developer to black points of the agglomerated carbon black particles, and avoid generation of the black points, which enhances display and light emitting performance of the display panel.

The embodiment of the present application discloses a display panel, a manufacturing method thereof, and a display device thereof. The display panel comprises a light emission functional layer and a color filter layer located on the light emission functional layer. The color filter layer comprises a light shielding units. The light shielding units comprises a light shielding material. The light shielding material comprises a light shielding composition. The light shielding composition comprises a plurality of carbon black particles, and at least one function group on surfaces of the carbon black particles. The function group is an acidic functional group or a free radical capture group. The acidic functional group is one of a carboxyl group, a hydroxy group, and a carbonyl group. The free radical capture group is a ketone group. The present application modifies oxygen-containing group on the surfaces of the carbon black particles, generates acidic functional groups and free radical capture groups on the surfaces such that activity and polarity of the surfaces of the carbon black particles increase, an agglomeration trend of the carbon black particles decreases to improve dispersion of the carbon black particles, increase dissolving reaction of the developer to black points of the agglomerated carbon black particles, and avoid generation of the black points, which enhances display and light emitting performance of the display panel.

It can be understood that for a person of ordinary skill in the art, equivalent replacements or changes can be made according to the technical solution of the present application and its inventive concept, and all these changes or replacements should belong to the scope of protection of the appended claims of the present application.

What is claimed is:

1. A display panel, comprising:
   a light emission functional layer comprising a plurality of light emitting units; and
   a color filter layer located on the light emission functional layer, wherein the color filter layer comprises colored color resists corresponding to the plurality of light emitting units and light shielding units each located between adjacent two of the colored color resists, the light shielding units comprise a light shielding material, the light shielding material comprises a light shielding composition, the light shielding composition comprises a plurality of carbon black particles and at least one function group located on surfaces of the plurality of carbon black particles, and the at least one function group comprises an acidic functional group and a free radical capture group;
   wherein the acidic functional group is a carbonyl group, and the free radical capture group is a ketone group;
   wherein at least three carbon atoms are connected between adjacent two of the at least one function group;
   wherein each of the at least one function group is connected to one of biphenyl rings of the surfaces of the plurality of carbon black particles;
   wherein a benzene ring of the biphenyl rings is at most connected to one of the at least one function group.

2. The display panel according to claim 1, wherein the at least one function group is located near an edge end of the biphenyl ring.

3. The display panel according to claim 1, wherein the light shielding material further comprises a carrier composition, a functional solvent, and a stabilizer;

wherein a mass percentage of the light shielding composition in the light shielding material is 1% to 10%, a mass percentage of the carrier composition in the light shielding material is 5% to 15%, a mass percentage of the functional solvent in the light shielding material is 70% to 90%, and a mass percentage of the stabilizer in the light shielding material is 1% to 5%.

4. The display panel according to claim 1, wherein a particle diameter of the plurality of carbon black particles is from 100 nm to 150 nm.

5. A display device, comprising a display panel and a device main body, wherein the display panel combines the device main body as a whole, and the display panel comprises:

a light emission functional layer comprising a plurality of light emitting units; and a color filter layer located on the light emission functional layer, wherein the color filter layer comprises colored color resists corresponding to the plurality of light emitting units and light shielding units each located between adjacent two of the colored color resists, the light shielding units comprise a light shielding material, the light shielding material comprises a light shielding composition, the light shielding composition comprises a plurality of carbon black particles and at least one function group located on surfaces of the plurality of carbon black particles, and the at least one function group comprises an acidic functional group and a free radical capture group;

wherein the acidic functional group is a carbonyl group, and the free radical capture group is a ketone group;

wherein at least three carbon atoms are connected between adjacent two of the at least one function group;

wherein each of the at least one function group is connected to one of biphenyl rings of the surfaces of the plurality of carbon black particles;

wherein a benzene ring of the biphenyl rings is at most connected to one of the at least one function group.

6. The display device according to claim 5, wherein the at least one function group is located near an edge end of the biphenyl ring.

7. The display device according to claim 5, wherein the light shielding material further comprises a carrier composition, a functional solvent, and a stabilizer;

wherein a mass percentage of the light shielding composition in the light shielding material is 1% to 10%, a mass percentage of the carrier composition in the light shielding material is 5% to 15%, a mass percentage of the functional solvent in the light shielding material is 70% to 90%, and a mass percentage of the stabilizer in the light shielding material is 1% to 5%.

8. The display device according to claim 5, wherein a particle diameter of the plurality of carbon black particles is from 100 nm to 150 nm.

\* \* \* \* \*